EDWIN HOYT.
Improvement in Lifting Jack.
No. 123,347. Patented Feb. 6, 1872.
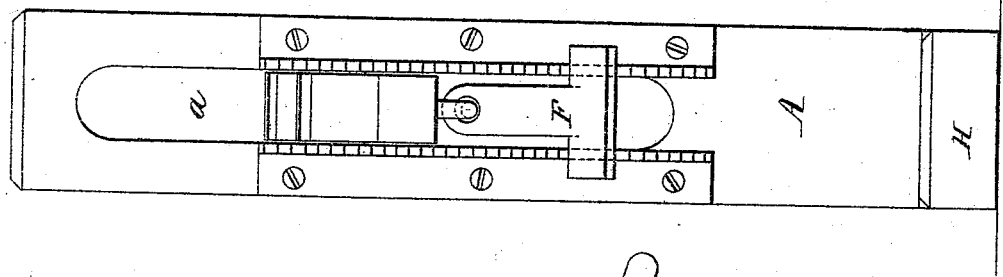
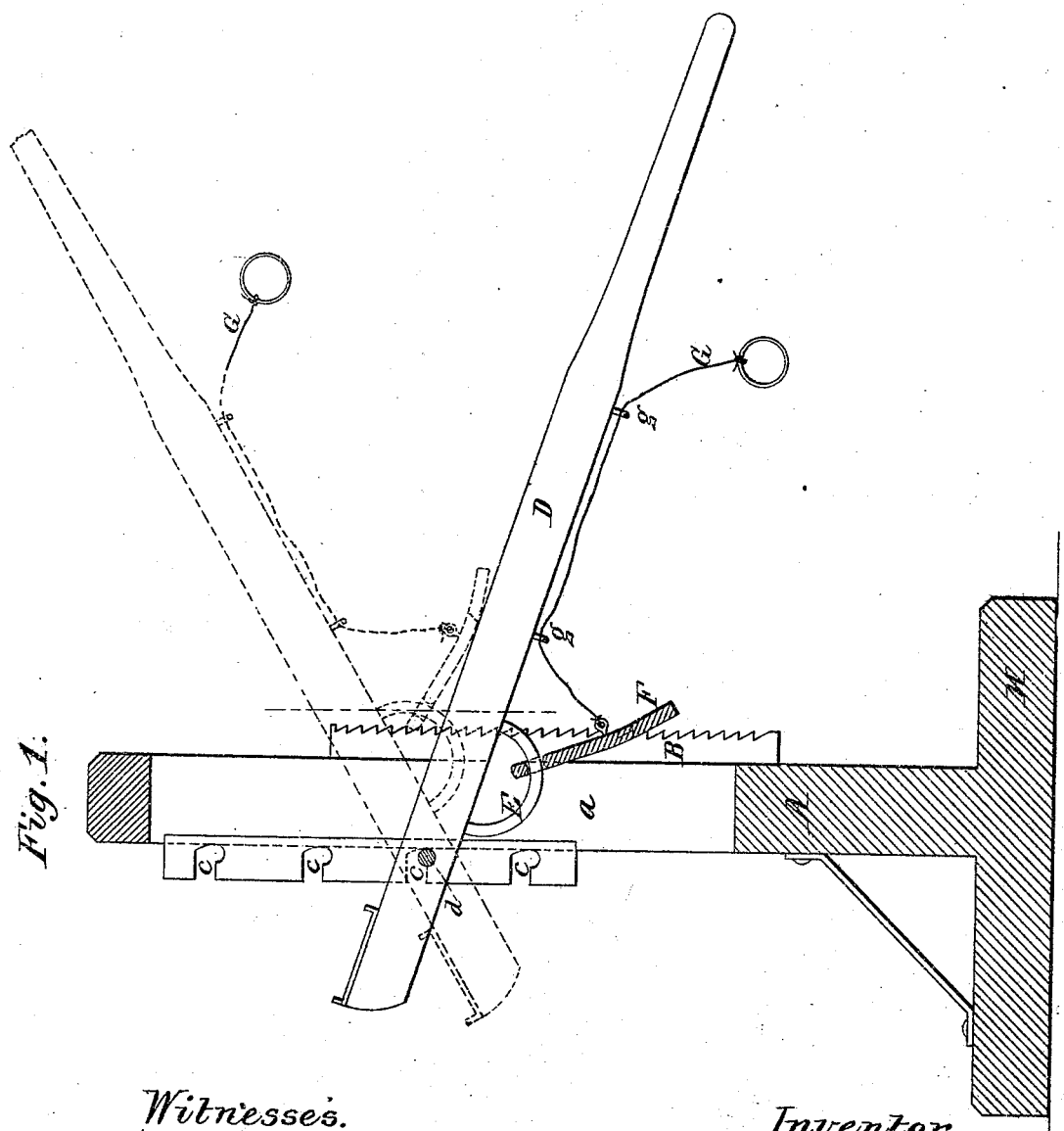
Witnesses.
Wm Howard
H. L. Perrine
Inventor:
Edwin Hoyt
by his attorneys
McLellan & Burdich 123,347

UNITED STATES PATENT OFFICE.

EDWIN HOYT, OF STAMFORD, CONNECTICUT.

IMPROVEMENT IN LIFTING-JACKS.

Specification forming part of Letters Patent No. 123,347, dated February 6, 1872.

SPECIFICATION.

I, EDWIN HOYT, of Stamford, in the county of Fairfield and State of Connecticut, have invented a certain Improvement in Carriage-Jacks, of which the following is a specification:

My invention relates to an adjusting carriage-jack with lever, elongated staple, and self-engaging pawl.

*Description of Accompanying Drawing.*

Figure one (1) is a vertical section. Fig. two (2) is a back view.

A is upright bar. *a* is slot in bar A. B is rack on rear of bar A, having serrated teeth opening downward. C C are series of bearings in front side of bar A, cut either in the bar or in plates of metal fastened to it. D is lever for raising carriages. *d* is pin on which lever rests in bearings C C. E is elongated staple, by which pawl F is connected with lever D. F is pawl. G is a cord or rod attached to pawl F, and running through eyes *g g* in under side of lever D. H is bottom piece or support of bar.

The construction and operation of the several parts may be readily seen on an examination of the drawing. The upright bar A has a slot, *a*, running through it from front to rear, and extending nearly its whole length. On the front of this bar is a double series of bearings, C C, forming the fulcrums for support of the lever D, which is made in the usual manner. On the rear of the bar is the double rack B, whose teeth, opening downward, engage the face of the pawl F, and thus furnish the counterpoise to the weight of the carriage when it is raised by the lever. The pawl F is attached to the lever D by means of an elongated staple, E, along which it travels freely, and by which arrangement the pawl, by its own weight drops against the teeth of the rack B. In order that the pawl may easily be disengaged a cord or rod, G, is attached to it and runs through eyes *g g* in under side of lever D to a place where it may be grasped by the hand that at the same time is pressing the lever.

To use the jack, the pin *d* is placed in one of the bearings C in the position represented in the dotted lines. The outer end of the lever is then depressed, lifting the carriage, and the pawl, by its own weight, falls against a tooth of the rack B, and the lever is sustained in the position desired, as represented by the unbroken lines in the drawing, Fig. 1. When it is desired to lower the carriage, the outer end of the lever is slightly depressed, the cord or rod is drawn back, releasing the pawl and permitting the lever again to take the position represented by the dotted lines.

I am aware that most of the parts of the jack have been used, and that the patent of Fowler, April 4, 1871, embraces many of them. But my invention differs from others, and especially from Fowler's, in the arrangement by which the pawl is made self-engaging.

What I claim as my invention, and desire to secure by Letters Patent, is—

The pawl F and elongated staple E, in combination with lever D, pin *d*, cord or rod G, and upright A, constructed with bars H, slot *a*, rack B, and series of bearings C C.

Witnesses:
S. B. HOYT,
E.E. SCOFIELD.

EDWIN HOYT.